United States Patent [19]

Knape

[11] Patent Number: 4,952,264
[45] Date of Patent: Aug. 28, 1990

[54] METHOD FOR PRODUCING PLASTIC COMPONENTS

[75] Inventor: Michael Knape, Marl, Fed. Rep. of Germany

[73] Assignee: VTM-Verfahrenstechnik AG, Schweiz, Fed. Rep. of Germany

[21] Appl. No.: 174,250

[22] Filed: Mar. 28, 1988

[30] Foreign Application Priority Data

Jul. 1, 1987 [DE] Fed. Rep. of Germany ....... 3721780
Aug. 5, 1987 [DE] Fed. Rep. of Germany ....... 3725932
Jan. 22, 1988 [DE] Fed. Rep. of Germany ....... 3801854

[51] Int. Cl.$^5$ ............................................. B32B 31/08
[52] U.S. Cl. ..................................... 156/164; 156/213; 156/224; 156/285; 156/301; 156/552; 264/512; 264/163
[58] Field of Search ............... 264/510, 512, 320, 322, 264/553, 163; 156/164, 213, 285, 380.8, 222, 224, 552, 556–559, 300, 301

[56] References Cited

U.S. PATENT DOCUMENTS

| | | | |
|---|---|---|---|
| 3,822,161 | 7/1974 | Haase | 264/163 |
| 4,104,349 | 8/1978 | Hillgenberg | 264/163 |
| 4,382,762 | 5/1983 | Schepp | 425/302.1 |
| 4,451,721 | 5/1984 | Nemeskeri | 264/163 |
| 4,678,527 | 7/1987 | Ulman | 156/213 |

FOREIGN PATENT DOCUMENTS 2852697 6/1980 Fed. Rep. of Germany.

Primary Examiner—Jill L. Heitbrink
Attorney, Agent, or Firm—Kinney & Lange

[57] ABSTRACT

A process for producing plastic parts, in particular molded plastic articles that are deep-drawn in a shaping contrivance into molded articles from at least one heated plastic foil, with the molded articles then being separated from the molded article assemblage in the separating contrivance and conveyed with the aid of a transport contrivance to successive processing stations such as a printing unit, or a stacking contrivance or the like. The shaping and detaching of the individual molded articles made of the still warm foil are executed directly after one another at one station, with forming taking place first and detaching then following by means of strip steel cutting, while the form still remains in the closed condition. It is also possible, with the aid of this process, to produce molded articles consisting of two superimposed foils with layers of an absorbent material disposed therebetween.

10 Claims, 5 Drawing Sheets

METHOD FOR PRODUCING PLASTIC COMPONENTS

BACKGROUND OF THE INVENTION

1. Field of the Invention

The invention concerns a process for producing plastic parts, in particular plastic molded articles such as, for example, plastic trays that are deep drawn in a shaping apparatus into molded articles from at two plastic foil strips.

2. Description of Prior Art

In one known process of this kind, plastic bulk articles such as trays for packaging meat, egg cartons, cups and plates made of a plastic film (foil, sheeting) e.g., of polystyrol, polyvinylchloride or polyethylene are produced in a compression molding press by vacuum or compressed air drawing, by means of special tools, and with the plastic film, heated beforehand on a strip heater. In this production phase, the deep-drawn plastic parts, referred to herein as "molded articles", are still joined together at their edges in a molded article unit. Detaching (separating) the molded articles is done by means of a punch press. Various other processing units, such as a printing unit, a hole station, a perforating mechanism or a depositing mechanism can be disposed between the compression molding press and the punch press, along with a stacking apparatus after the punching press. The transport apparatus for transport of the foil, of the molded article unit and of the molded articles from processing unit to processing unit generally consists of an intermittently driven, special chain conveyor gripping under both edges of the foil. During this transport movement, the molded article unit is, on the one hand, because of the cooling process, subjected to a change in size by shrinkage and, on the other hand, subjected to a displacement within each working cycle because of the summing of the play movements in the links of the individual chain members. The deviation of the operating position of the molded article unit from its set point position resulting within one work cycle because of this becomes all the greater, the greater the distance between two adjacent processing units.

Now, in order to have each processing procedure in the processing units, as well, in particular, as separating the molded articles in the punch press, occur at exactly the desired spot, an alignment procedure is needed for each processing unit. This alignment procedure is done based on the known process, either by the fact that the molded articles, because of their particularly conical form, center themselves in the associated tool or, when such is not the case, they center themselves by means of special centering cones co-formed in the foil strip when closing the particular processing tool.

This kind of aligning is particularly problematic in the case of very flat plastic parts with a very low sidewall cone or, in particular, if there is insufficient place available in the molded article strip for separate centering cones. In the case of the individual processing units, this unavoidably leads to irregularities and, when separating the molded articles at the punch press, even leads to non-equally running cut edges, in brief to a higher rejection rate, that in turn is reflected in the overall costs.

Therefore, proposed in German Offenlegungsschrift 28 52 697, has been a process through means of which the irregularities of the punched out edges of the molded article are avoided. This occurs by adjustment of the punch station relative to the forming station by means of an electric motor. Adjustment of the punch station is accomplished via a correction control circuit, that works with the aid of photocells that scan the hole marks punched into the molded articles in the forming station, and that correct the punch station in correspondingly positive or negative fashion in the running direction of the foil.

However, in spite of essential improvements, the accuracy of correction still displays the following deficiencies:

1. A 100 percent correspondance of the edges between form contour and punch contour is still not achieved.

2. The adjustment of the punch produced by the photocells for the purpose of correction requires a certain time loss, which negatively influences the capacity of the machine.

3. Upon conveyance from the forming station and insertion into the punching station, the foil cools. The molded articles are deformed by shrinkage and, therewith, even in the case of exact correction of the punch station, are punched out irregularly.

4. By cooling of the molded articles, essentially higher punching forces are required.

5. The overall length of the machine is too great because of the separate arrangement of forming station and punching station.

6. Energy consumption is relatively high, ocasioned by the use of auxiliary drives such as
  (a) forming station drive,
  (b) hole station drive,
  (c) travel path drive for punch correction, and
  (d) higher forces of friction, and thereby-occasioned higher motor power in the foil feed.

7. Higher tool costs occur in the case of the known process because of use of separate forming and punching tools.

8. This also occasions considerable refurbishing times when changing the machine over to another article.

9. Expanded polystyrol has the property that, when expanding, formed are relatively compact external skins, while forming in the center, through means of the propellant, is a foam structure mixed with air bubbles.

Post-forming of the foil in the heating zone of a thermoforming machine causes expansion of the foil thickness from the initial thickness to a multiple, depending upon the temperature and the heating time. In so doing, the external skins remain almost compact. Now, when the molded article is formed and punched in separate stations in accordance with the known process, the foil cools down between the forming process and the punching process. The external skins are then no longer plastic because of the increased temperature, but rather brittle. During the punching process, the molded articles are separated based on the shearing cut principle. Therefore, remaining at the cut edges are thin, compact skins, and, therebetween, a foamed intermediate layer. Therefore, there is no homogeneity of the punched edges. The cut is raw and irregular. Reasons for this are the following: As already stated above, the foil, in the case of the separating process based on the known procedure, has already cooled and is solid. Through means of the shearing forces, all three structures (top external skin, intermediate layer, lower external skin) are separated by one same fast movement. In so doing, the three structures are detached separately from one another, one after the other. That is to say that the foam structure is open at the cut edges. Therefore, for example, water can infiltrate at this location. Additionally, these external edges are also exposed to destructive forces by mechanical influences.

SUMMARY OF THE INVENTION

Therefore, starting out from this state of the art, the object of the invention is to obtain a process of the initially mentioned type, as well as to procure a apparatus for carrying out this process, while avoiding the aforementioned disadvantages in a cost-favorable manner, as well as to exclude the deviations in position resulting from the transport as well as the shrinkage of the molded articles, and therewith to also achieve a rejection-free production of very flat plastic parts.

This objective is met in accordance with the invention by the following features; shaping and separating of the individual molded articles made of the foil are done directly one after the other in a single station, with shaping taking place first and then separation by means of strip steel cutters, while the form still remains in it closed position.

Since the shaping and the separating process take place at one and the same station, with the separating process already starting when the shaped, still warm part is still enclosed between the two form halves, the stamping and the shaping die, guaranteed is that the molded articles will be separated out from the assemblage of molded articles exactly along the desired peripheral lines. Even molded articles made of compact foils, whose individual layers can display different coefficients of heat expansion, display a 100 percent exactness of their peripheral lines. This one hundred percent exactness is of importance not only from the aesthetic point of view, but rather also a necessity relative to automatic packing and unstacking in the packaging automat.

Another advantage of the process in accordance with the invention is to be seen in the fact that a molded article, e.g. a tray, can be produced in the negative process without a positive tool being required. For example, in order to produce a negative tray with a height of 20 mm, in order to maintain the height no double tool is required. By appropriate embodiment of the negative tool and the difference in height between the cutting and the forming tool, one obtains an exact calibration of the height of the trays. In other words: the distance from the deepest point of the negative tool to the surface of the stamping plate in the final phase of separation is set once and is always maintained exactly. The foil is drawn into the form at the time of shaping by applying a vacuum. Even if the foil is differetly formed in the longitudinal and/or in the transverse direction because of unequal heating setting, the height of the individual molded articles will nevertheless remain the same.

Since the foil is not subjected to any change in temperature between the shaping process and the separating process, and therewith also no shrinkages can occur, an exact separation at the contours provided therefor is guaranteed. Moreover, the aforementioned process offers the advantage of the separating process being made easier because of the still warm plastic foil, and therefore lesser stamping forces are required. Due to the fact that the shaping process and the separating process take place in a single station, the structural length of the overall machine is also essentially shorter. Tool costs can also be lowered as well as can be the refurbishing times when changing the machine over to another article.

By using a steel ruled blade in the form of a strap (hereinafter referred to as strip steels or strip steel cutters) in the separating apparatus, obtained as a further advantage of the invention is that, in contrast to the usual fall-through cut, no webs appear as a waste product between the individual molded articles. Therefore, it is possible to form the molded articles tightly next to one another from the plastic foil.

Another advantage of the invention is obtained from the use of strip steel cutters. Due to the fact that the shaped, still warm foil is cut through at the lines of separation by specially formed strip steel cutters, whereby, at the time of the cutting procedure the edges of the molded article being clamped by the strip steel between this latter and the stamping plate, the edges are welded in this position. In the case of the fallthrough cut, particularly with compact foils in the case of already cooled assemblages of molded articles, resulting were unsightly edges, concave in cross section. Among other things, this additionally led to the fact that the assemblage of individual layers, in the edge region, dissolved in the plastic foil and/or, for example, water could enter. In the case of the present process, the strip steel cutters pull one of the two smooth external skins of the foil toward the oppositely lying external skin, guides it about the intermediately lying foam structure and welds them together.

This welding procedure is made easier by the fact that, the strip steels are heated. This has the further advantage that the stamping forces can be reduced further.

Over and above the advantage of saving on one complete station (separate stamping station), obtained by the fact that the same pressure medium cylinder is used for driving the shaping stroke and the separating stroke of the form is another reduction in expense for equipment. Both the forming stroke and the separating stroke are effected by one and the same pressure medium cylinder. This pressure medium cylinder can, for example, be embodied such that it is capable of being switched over from pneumatic operation to hydraulic operation. These pressure medium cylinders are well known to those skilled in the arm and therefore will not be the subject of this disclosure. Here, the pressure medium cylinder first executes a pneumatic rapid stroke for forming, and afterwards a hydraulic force stroke. Forming follows at the end phase of the rapid stroke and the slow phase of the force stroke. The entire foil is still plastic. The foil draws itself over the strip steel section in the rapid stroke and in part of the force stroke without being stamped out. In this manner, the foil receives the contours of the forming tool and of the strip steel section. Following desired forming of the molded article, the force stroke in its final phase, extends into its end position and stamps through the remainder of the foil thickness. The end position is randomly adjustable and depends upon the foil thickness.

In one prefered embodiment a pressure medium cylinder is used but, the forming and separating stroke can also be effected by a mechanical drive. The molded articles can, in known manner per se, be formed out from the heated plastic foil by pressure as well as by vacuum deformation.

If forming is done by vacuum, then, the vacuum channels can serve as compressed air channels for casting out the molded articles.

The plastic foil can be deformed positively as well as negatively. In the case of negative forming, the plastic foil can be drawn into the form by application of a vacuum, in the case of positive forming the plastic foil is drawn over a form by means of compressed air and/or a vacuum. It is naturally also possible to form out the molded article with the aid of the cooperation between male and female die.

In accordance with the process of the present invention, plastic molded articles can be produced from two plastic foil strips disposed one over the other with a cellulose layer disposed between these plastic foil strips.

In a first step one of the plastic foil strips is provided, on its surface pointing toward the other plastic foil strip, with cellulose segments. The arrangement of the segments on the plastic foil here corresponds to the later arrangement of the molded articles in the molded article assemblage. The dimensions of the segments correspond approximately to the dimensions of the floor area of the later molded articles, with lateral tolerances being provided between the contours of the segments and the contours of the floor region. At the time of forming out and of the later separation of the molded articles from the molded article assemblage, the plastic foils are joined directly with one another and additionally welded with one another in the edge region. Formed therewith is a molded article that is constructed in three layers in the floor region alone, so that the plastic foils can be internally joined with one another in the rim region. Bursting (cracking) of the edge region is therewith excluded. In the case of known molded articles made up of two plastic foils with intermediately lying cellulose layer, the cellulose layer extended from one rim of the molded article, over the floor region, up to the other rim of the molded article. Because of this arrangement, an inner connection of the rim region was not guaranteed through the intermediately lying cellulose layer. The molded articles broke open in the edge areas and therewith could not be used further. These types of molded articles serve, for example, for packaging fresh meat, whereby the cellulose layer absorbs the blood and/or the meat juice coming out of the meat via the holes in the hole pattern of the one foil strip. This meat juice and/or the blood could come to the outside via the cracked edges of the molded articles which, for one thing, is unsanitary and, for another thing, allowed the molded article and/or the packaging to become unsightly. In the case of the molded article based on the process in accordance with the invention, bursting of the edge area is excluded so that leaking of blood and/or of meat juice in this region is no longer possible.

Further resulting is the advantage that the layer of absorbent material can be embodied thicker than in the case of the previously known process for improving its efficiency, since a thickening of this type does not influence the rim region. Independently of the thickness of the intermediate layer, further guaranteed is an inner joining of the plastic foils in the rim region. In the case of the previously known process, thickening of the intermediate layer has as its consequence that the disadvantages when sealing off in the edge region of the molded article are increased further.

A further advantage of the process in accordance with the invention is to be seen in the fact that the blend, which displays no kind of cellulose material, can be reused.

Advantageously, the segments are attached to the foil strip with the aid of an automatic labelling machine. The labelling contrivance has an outrigger that is moved out from the production line under a magazine disposed near the production line. Here, the outrigger displays a number of tools for accommodating the segments, coresponding to the number of segments to be applied. The outrigger is raiseable and lowerable. In the raised condition, it picks up the segments from the magazine, is lowered, moved back into the production line, whereby, in the raised condition, it brings the segments onto the foil strip. Afterwards, the outrigger again travels under the magazine, while the foil strips are moved forward one cycle, so that there is space available for bringing additional segments onto the foil strip. The use of a labelling contrivance has not only the advantage of a more rational and therewith faster production of the molded articles. There are also advantages relative to the precision of laying the segments onto the foil strip. Therewith guaranteed is that the segments are always applied exactly at those places on the foil strip that correspond to the later floors of the molded articles.

Advantageously, the hole pattern in one of the foils is produced by hole rollers such that the hole patterns are located at exactly those places in the foil that correspond to the floor region of the molded articles, and/or to the position of the segments on the foil.

The shaping and separating for molded articles is achieved essentially by a stamp attached to the punch plate and/or a molding cup (die) to be moved thereupon and disposed on a lift table. Provided between the individual outformings of the mold are cutouts for guiding cutting tools that consist of strip steel. These strip steels have available, at their free end facing toward the punch plate, a cutter than can either run to a point or that can also be shaped otherwise.

In another advantageous form of embodiment of the invention, provided for is that the mold (form) consist of an inner part region and a rim region surrounding this latter, separated from one another by a gap. If, for example, a plate is being produced, the inner part region of the mold forms the floor (bottom) region of the plate while the rim region surrounding the inner part region forms the side wall, resp. the plate rim. Here, at the time of the shaping procedure, some of the plastic foil presses itself into the circular gap so that a circular bead results in the floor region, imparting greater stability to the plate. Another advantage of this embodiment is to be seen in the fact that the gap can serve both as a vacuum channel and as a compressed air channel for casting out the finished molded articles.

BRIEF DESCRIPTION OF THE DRAWINGS

The invention will be represented and explained in more detail in the following with the aid of drawings.

DETAILED DESCRIPTION OF THE PREFERRED EMBODIMENTS

Figure 1:
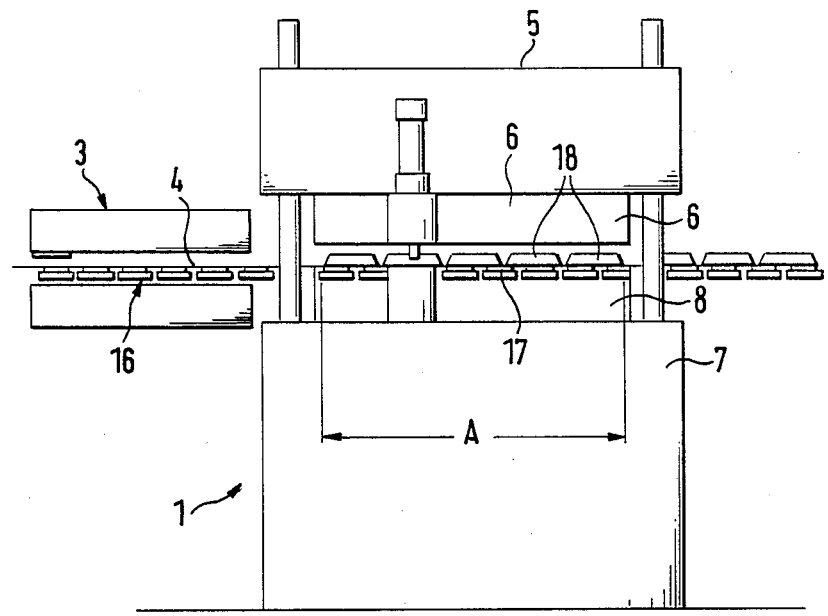
FIG. 1 shows a schematic side view of a combined shaping/separating station of the present invention.
Figure 2:
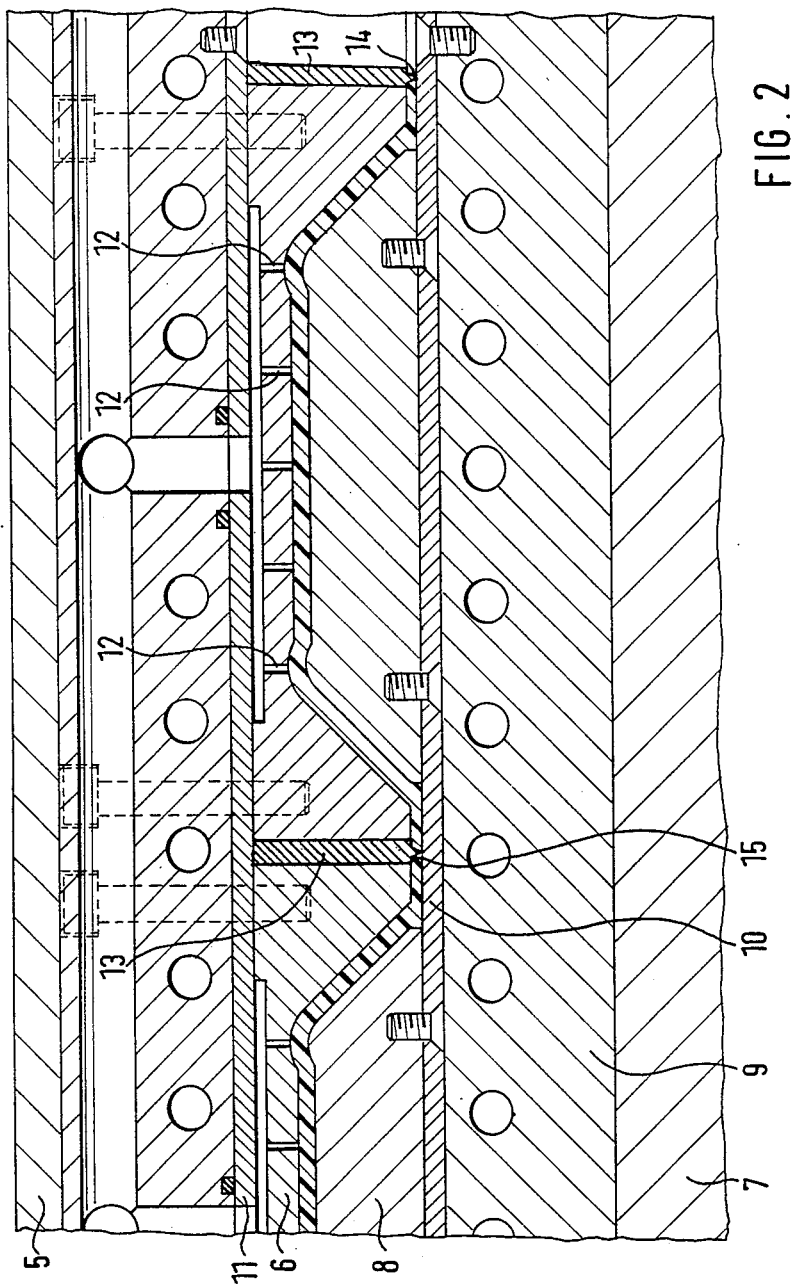
FIG. 2 shows an enlarged cross section of the shaping/separating apparatus, of the present invention in a cut.

In FIG. 1, a thermo-deforming apparatus and a separating contrivance are designated overall with the reference number (1). Disposed near the apparatus (1) is a strip heater (3) for heating the plastic foil (4). In the present case, the lift table (5) carries a molding cup (6) where, on the other hand, the lower lift table (7) carries a stamp (8), however with a cooling plate (9) and a punch plate (10) being further disposed between the lower lift table (7) and the stamp (8) (see FIG. 2). Provided between the molding cup and the upper lift table (5) is an upper punch plate (11) capable of being raised and lowered independently of the molding cup (6), as well as another upper cooling plate disposed above the punch plate (11). Not represented are the supply lines for the cooling medium, respectively for the compressed air for pressure deformation, respectively for the ejecting the molded article. Likewise not represented is the vacuum generator for the alternatively possible vacuum deformation. Rpresented are only the channels (12) through which the air can be drawn out from the molding space (see FIG. 2).

To be added further is that the molding cup (6) can also be disposed on the lower lift table (7) and the stamp (8) on the upper lift table (5). Provided in the molding cup (6), in the direction of lift movement, are cutouts that surround the outformings of the molding cup (6) corresponding to the desired rim dimensions of the molded articles. Guided in these cutouts are strip steels (13) that are attached to the upper punch plate (11). At their free ends, the strip steels display cutters (14) that are smaller in diameter than the remainder of the strip steel. The cutter length in the present example is about 2 mm, so that there appears, above the cutter (14), on both sides thereof, a shoulder (15). The lift movement for the deforming procedure as well as for the separating procedure is triggered by a single pressure medium cylinder, which is not represented in the drawing.

Running underneath the foil strip (4) is a special chain conveyor (16), whose chain members (17), for the purpose of their pivoting mobility, are given a certain amount of play. This chain conveyor (16) running underneath the foil (4) in the case represented, transports the foil (4) out from the strip heater (3) into the deforming/separating apparatus (1) in which, over a section of length A, a certain number of molded articles (18) connecting in a molded article unit (17) are deep drawn by means of vacuum or compressed air. Next, the molded articles (18) are transported out from the apparatus (1) by the chain conveyor (16) to other processing stations. Since the plastic foil (4) is immediately subjected to a cooling process after leaving the strip heater (3), it and also the molded article unit (17) formed in the apparatus (1) are subjected to a continuous shrinkage. Due to the fact that the molded articles (18) are separated out from the molded article unit (17) directly in connection with deformation, in the same station, with the mold still closed, guaranteed is an exact operation, respectively exact separation of the individual molded articles along the desired peripheral lines. The special embodiment of the strip steel cutters (14) carries along with the it the fact that when cutting through the foil strip the cutter is clamped between the shoulders (15) in the strip steel (13) and the punch plate. The edges of the molded articles are welded in this condition. Runoff of the process for producing the molded articles is as follows: The foil strip (4) placed into the open apparatus (1) and which has been heated in the upstream strip heater (3), is deformed by closure of the apparatus (1), i.e. by a relative movement toward one another of stamp and molding cup, or production of either a vacuum or by pressure impacting, doing away with the stamp. For this purpose, the pressure medium cylinder, which is not represented, executes a pneumatic rapid stroke. Occurring then within the pressure medium cylinder is the switchover from pneumatic to hydraulic operation. The pressure medium cylinder executes a hydraulic force stroke that presses the strip steels with their cutters through the foil toward the lower punch plate. In so doing, the still "clamped" molded articles are separated out from the molded article assemblage. Simultaneously, because of the special forming of the cutters (14,15), respectively because of the heated strip steels, the edges of the molded articles are welded. The punched-out molded articles are separated or ejected from molding cups (6) with compressed air applied through channel (12). Once the molded articles (18) are separated from the molding cups (6), they are transported from the apparatus (1) by the chain conveyor (16).

Figure 3:
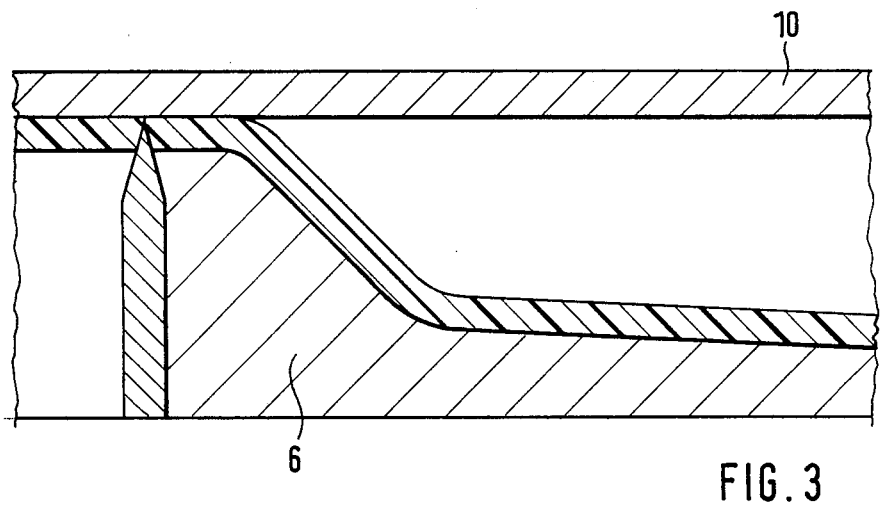
FIG. 3 shows, in a cut, an enlarged cross section through the shaping/separating apparatus, without stamping die.

Represented in FIG. 3 is a deforming (shaping) tool consisting of only a molding cup (6). By applying, e.g., a vacuum, the foil is drawn into the molding cup (6) (negative deformation), the distance from the punch plate (10) to the lowest point of the molding cup is held constant while doing this. In this example of embodiment, the strip steels display a cutter running to a point.

Figure 4:
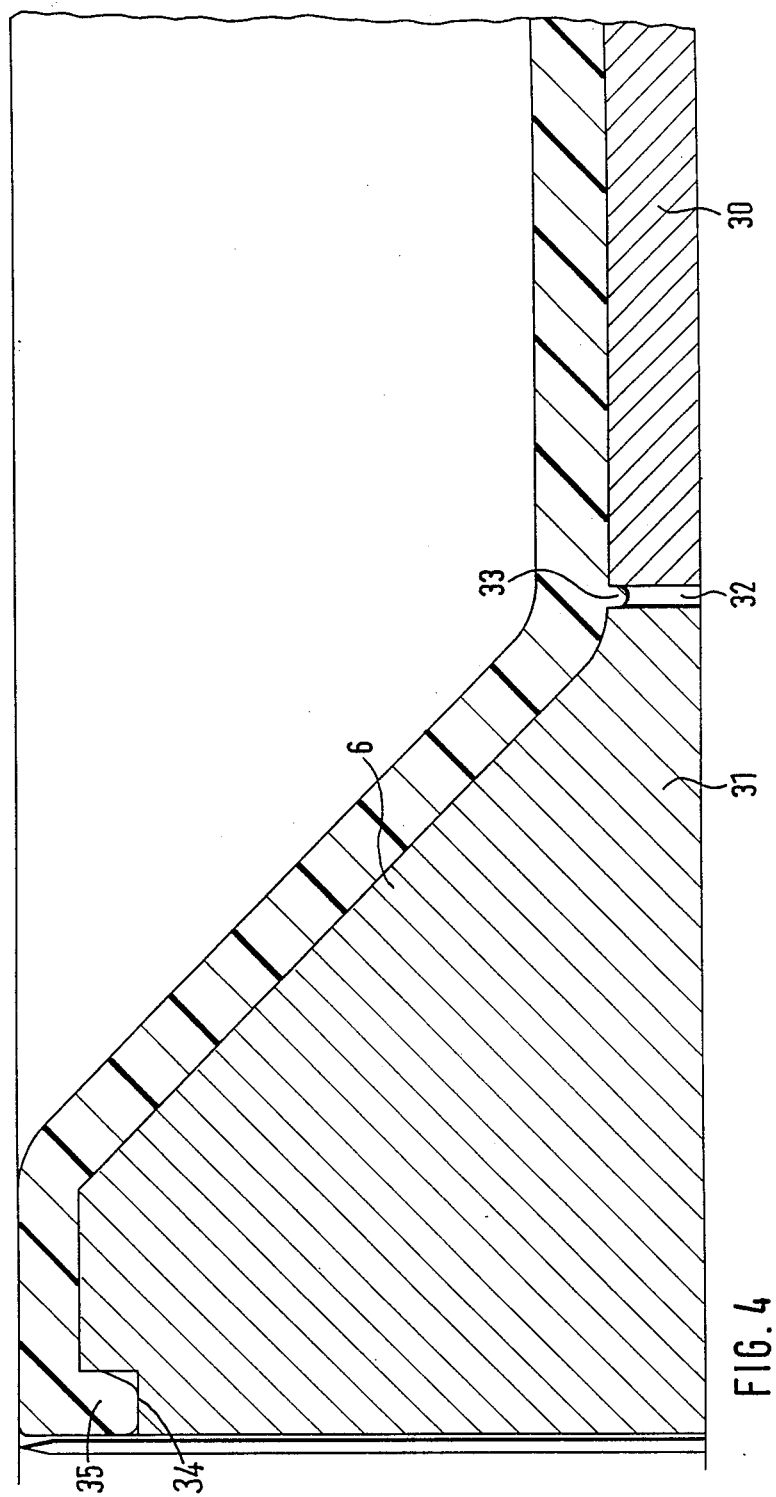
FIG. 4 shows, in a cut, an enlarged cross section through the shaping/separating apparatus, with divided mold.

Represented in FIG. 4 is another form of embodiment. Like in FIG. 3, also eliminated here is the stamp, and deformation of the plastic foil is effected by the cooperation of the molding cup (6) with an applied vacuum. This molding cup is constructed in two parts, whereby an inner part region is given the reference nunber (30) and a rim region surrounding this latter is given the reference number (31). Left between the two regions (30 and 31) is a gap (32) into which material from the plastic foil presses during the deformation procedure. This material forms a ring bead closing back on itself (30) in the gap. At its upper outer edge, the rim region (31) displays a circular ring groove (34) into which foil material is likewise drawn during the deforming procedure. In this manner, also formed at this location is a closed ring bead (35). Represented at the far left in the drawing is the strip steel with its cutter that is responsible for separation.

Figure 5:
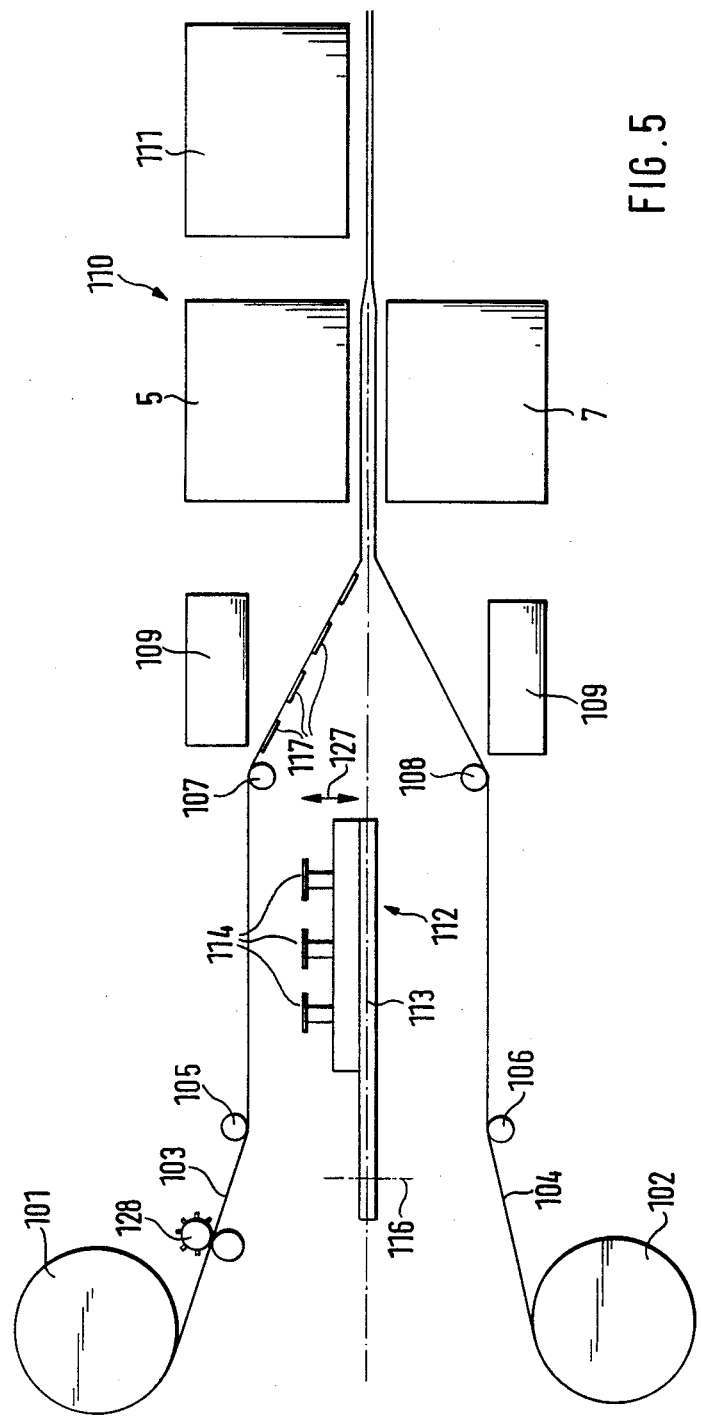
FIG. 5 shows a schematic side view of the entire apparatus of the present invention for producing plastic molded parts.

FIG. 5 shows another example of embodiment of the apparatus in accordance with the invention. In FIG. 5, designated with the reference numbers (101 and 102) are two spools disposed at a vertical interval from one another for an upper (103) and a lower (104) plastic foil strip. The plastic foil strips (103 and 104) are unwound by the spools (101 and 102) and guided about rollers (105 and 106) such that the foil strips (103 and 104) run parallel at some distance from one another. In the further course of the plastic foil strips, these latter are guided about rollers (107 and 108), whereby they are transported onward running diagonally to one another.

Figure 6:
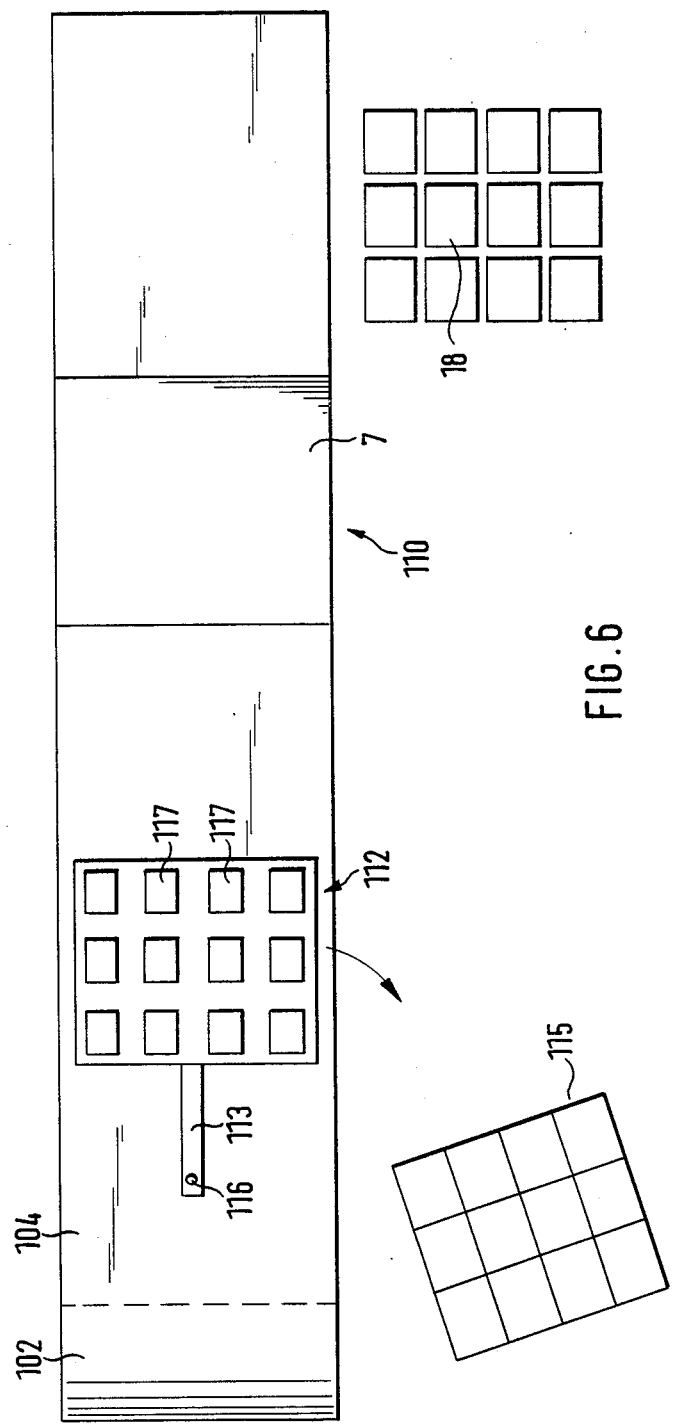
FIG. 6 shows apparatus in accordance with FIG. 5, in a top view, whereby, for reasons of clarity, the upper plastic strip and the station apparatus disposed above the upper plastic strip have been omitted.

Disposed behind the rollers (107 and 108), in the processing direction, is a heating station (109), adjoining which is a combined molding and separating station (110). Connected after the molding and separating station (110) is a stacking station (111). Disposed between the rollers (105, 106; 107, 108), in the intermediate space between the plastic strips (103 and 104) that run parallel there, is a labelling apparatus (112). The labelling apparatus (112) displays an outrigger (113) that carries on its side pointing toward the foil strip (103) tools (114) that remove segments (117) of an absorbent material, e.g. a cellulose layer, from a magazine (115) represented in FIG. 6. For this purpose, the outrigger (113) is pivotable about the axis (116) out from the processing line, i.e. out from the intermdiate space between the plastic foils (103 and 104), under the discharge openings of the magazine (115). The outrigger (113), in accordance with the double arrow (127), is simultaneously designed to be raiseable and lowerable. The plastic foils (103 and 104) are transported cyclically through the entire apparatus. At each cycle, i.e. each time the transport apparatus stops, the outrigger (113) is pivoted under the plastic foil (103). In this position, it is raised and deposits, during the lifting procedure, the segments (117) located on the top side of its tool (114), onto the underside of the plastic foil (103). They are attached there. Then, the outrigger (113) is again lowered and again pivots under the discharge chute of the magazine (115), where it is again raised and picks up an additional number of segments (117) of the cellulose material. When the outrigger again pivots back into its operating position, the plastic foils (103 and 104) move in the direction toward the heating station (109). In the station (109), the plastic foils (103 and 104) are heated and are supplied in this heated condition to the molding and separating station (110). The molding and separating station (110) corresponds in its structure to the apparatus in accordance with FIGS. 1 to 4. The arrangement of the tools (114) on the outrigger (113) here corresponds with the arrangement of the molding cups, respectively the molding stamps in the molding and separating station (110). Guaranteed therewith is that the cellulose segments (117) placed on the upper plastic foil (103) with the aid of the tools (114) are, in each case, disposed exactly in the area of the plastic foil (103) that forms the floor region of the article molded later. Here, the dimensions of the segments and the dimensions of the floor display certain differences. These tolerances are necessary in order, in each case, that an inner joining of the plastic foils (103 and 104) in the rim region of the molded article be guaranteed.

The heated plastic foil (103 and 104) with the cellulose material segments (117) disposed therebetween are shaped into molded articles in the molding cups and stamps. With the form still closed, the molded articles are separated out from the molded article assemblage. In the case of the apparatus in accordance with FIGS. 1 to 4, this occurs with the aid of strip steel cutters that are disposed in the form of the molded article contours. When doing this, the strip steel cutters weld together the plastic foils (103 and 104), which are pressed against one another, in the edge region of the molded article. In the next cycle, the molded articles in the stacking station are lifted out from the foil laminate and stacked laterally. The foil laminate blend can then be supplied for reuse.

With each cycle, i.e. every time the advance of the foil strips (103 and 104) is interrupted, the foil strip is simultaneously provided with cellulose material segments, the molded articles are formed out, separated out from the matrix assemblage and the already finished molded articles are stacked with the aid of the stacking station.

In order that the juice and/or the blood from the meat that is to be packaged later be capable of being picked up by the cellulose material segments, disposed in a regular or irregular pattern on the upper plastic foil (103), in the region of the cellulose material segments placed thereupon, are some holes. The hole pattern is made in the foil (103) by the hole rollers (128).

What is claimed is:

1. A process for producing plastic molded articles that are deep-drawn in a shaping apparatus into said molded articles from two plastic foil strips, one of which is provided with a hole pattern, bringing together the two plastic foil strips in the shaping apparatus, whereby, attached to one of the two foil strips, on its surface facing toward the other foil strip, are segments made of an absorbent material, shaping the two foil strips using a molding form and separating the molded articles by cutting edges made of strip steel in the same apparatus and transporting the articles to successive processing stations, whereby the segments are attached to the one plastic foil strip in a fixed relationship prior to bringing together the plastic foil strips and the segments are arranged together in a matrix arrangement, with each segment corresponding approximately with a contour of a floor of its respective molded article so that a rim region of each molded article is free from segment material, joining the plastic foil strips with one another in that rim region and welding the edges of the molded articles at the time of the separating procedure by the steel strip cutting edges.

2. The process according to claim 1, wherein the strip steel cutting edges are heated.

3. The process according to claim 1, wherein a pressure medium cylinder is used for driving a closing shaping stroke of the form and the same pressure medium cylinder is used for driving an opening separating stroke of the form.

4. The process according to claim 3, wherein the pressure medium cylinder, for the purpose of shaping, executes a pneumatic rapid-stroke for impressing contours of the molded article into the foil strip and a hydraulic force-stroke which separates the molded articles from one another with strip steel cutting edges.

5. The process according to claim 1, wherein the shaping apparatus includes a molding form and wherein a shaping and separating stroke of the form is accomplished by a mechanical drive.

6. The process according to claim 1, wherein the shaping of the molded articles is by vacuum shaping.

7. The process according to claim 1, wherein the shaping apparatus has the molding form which has channels therein for generating a vacuum to draw the foil strips into the molding form that also serve as compressed air channels for forcing molded articles out of the molding form.

8. The process according to claim 1 and further comprising the step of:
attaching the segments to one of the plastic foil strips by a labelling apparatus, whereby the labelling apparatus periodically removes and picks up the segments from a magazine disposed laterally next to the foil strips and, after travelling back between the foil strips, presses the picked-up segments against the foil strip.

9. A process for producing plastic molded articles that are deep-drawn in a shaping apparatus into said molded articles from two plastic foil strips comprises the steps of:

affixing a plurality of segments of an absorbent material in a spaced apart, matrix arrangement to a surface of a first plastic foil strip;

in a single station of the shaping apparatus:

bringing a surface of a second plastic foil strip together against the segments and the surface of the first strip, with one of the foil strips having a hole pattern therethrough;

forming the two plastic foil strips into the molded articles in a matrix arrangement wherein each of the segments corresponds approximately with the contour of a floor of its respective molded article so that a peripheral rim region of each molded article is free from absorbent material from its respective segment;

welding the plastic foil strips together in the rim region of each molded article;

separating the molded articles from one another along the welded rim regions thereof; and transporting the separated molded articles to successive processing stations.

10. The process of claim 9, and further comprising the steps of:

periodically supplying a plurality of the segments from a magazine disposed laterally next to the plastic foil strips;

transporting each plurality of the segments by a labelling apparatus, in their spaced-apart, matrix arrangement, from the magazine to a position between the first and second plastic foil strips; and transporting each plurality of the segments by the labelling apparatus toward the first plastic foil strip, in their spaced apart, matrix arrangement, to be affixed to the surface thereof.

* * * * *